March 31, 1925. 1,531,337
L. C. HILL
MOTOR VEHICLE
Filed Oct. 26, 1917 2 Sheets-Sheet 1
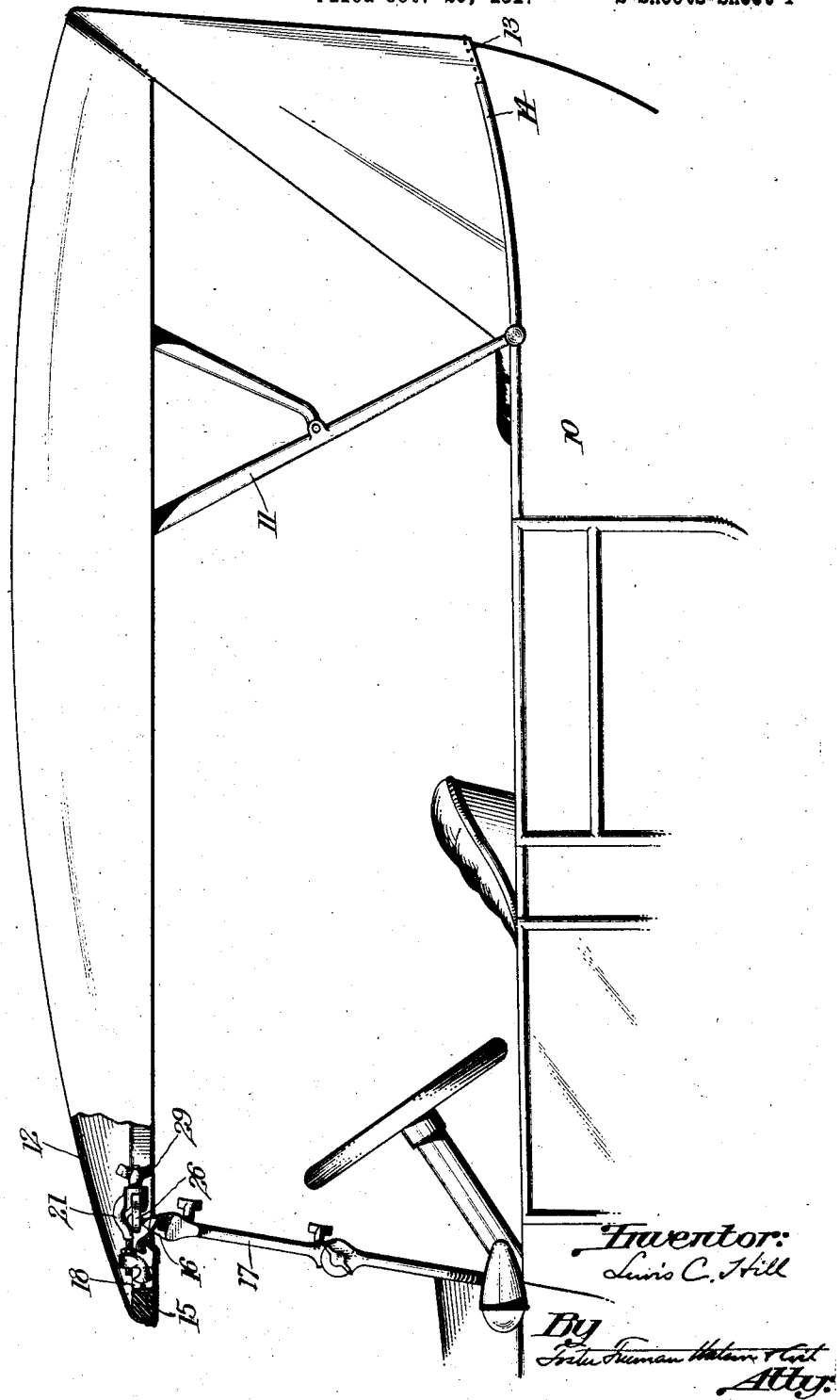

March 31, 1925.
L. C. HILL
MOTOR VEHICLE
Filed Oct. 26, 1917  2 Sheets-Sheet 2
1,531,337
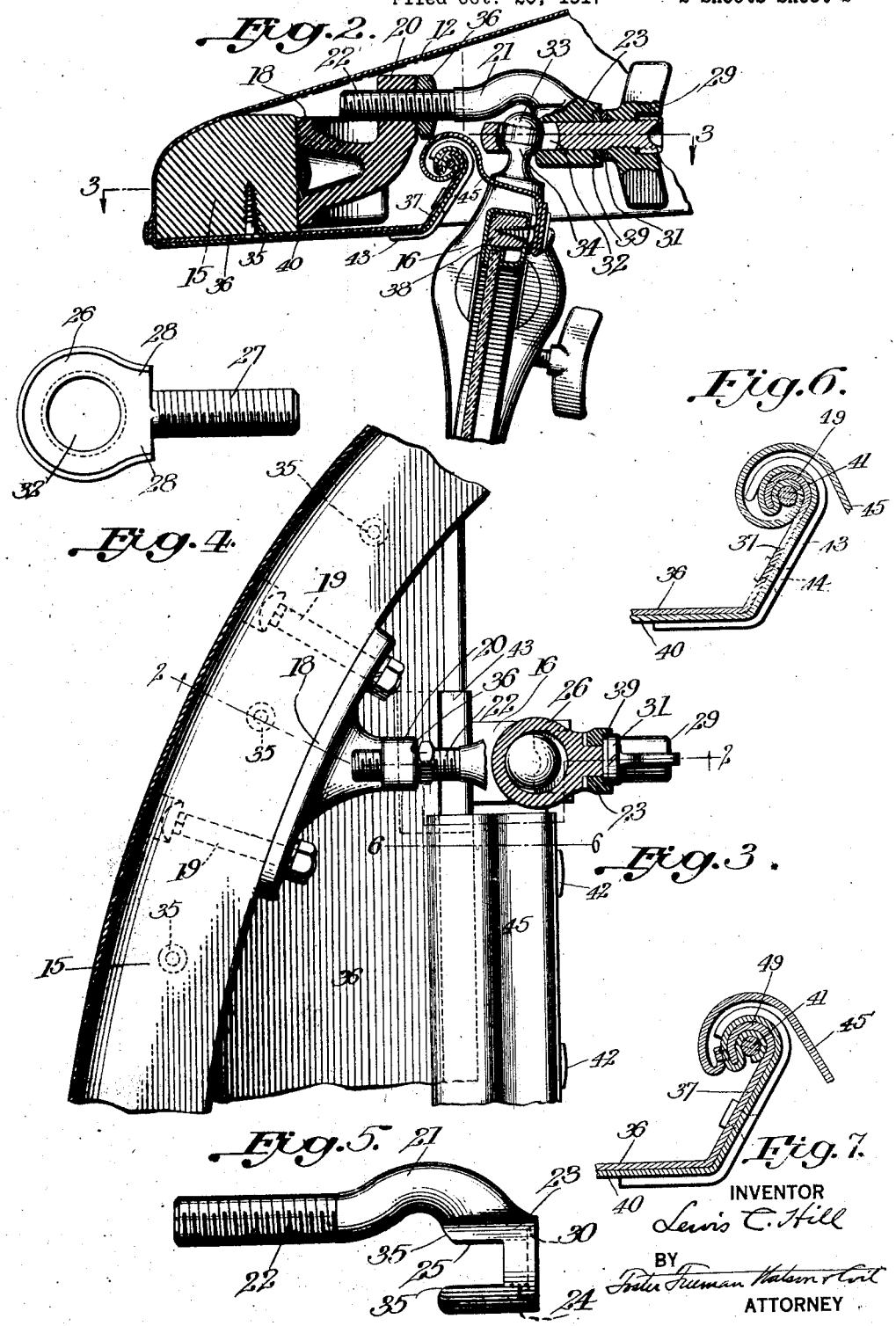
INVENTOR
Lewis C. Hill
BY
ATTORNEY Patented Mar. 31, 1925.

1,531,337

UNITED STATES PATENT OFFICE.

LEWIS CLAYTON HILL, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 26, 1917. Serial No. 198,658.

*To all whom it may concern:*

Be it known that I, LEWIS CLAYTON HILL, a citizen of the United States, and resident of Detroit, Wayne County, State of Michigan, have invented certain new and useful Improvements in Motor Vehicles, of which the following is a specification.

The present invention relates to motor vehicles and more particularly to a means for securing the front of the vehicle top to the wind shield.

The principal features of the invention consist in a top locking means adjustably interposed between the top and wind shield and arranged to be detachably secured to one of said parts and a novel means for closing the space between the top of the wind shield and the vehicle top. Other features and objects of the invention will be apparent from the description taken in connection with the drawings in which:

Figure 1 is a side elevation of a portion of the vehicle illustrating my invention in connection therewith;

Figure 2 is a sectional elevation taken substantially on the broken line 2—2 of Fig. 3;

Figure 3 is a sectional plan view taken substantially on the broken line 3—3 of Fig. 2;

Figure 4 is a plan view of the post engaging member;

Figure 5 is an elevation of the bolt forming part of the adjustable connection between the top and wind shield post;

Figure 6 is a sectional view of a detail taken substantially on the line 6—6 of Figure 3; and Figure 7 is a sectional view similar to Figure 6 showing a modification.

Referring to the drawings and more particularly Figure 1, 10 designates a vehicle body which is provided with a top frame 11 which may be of any desired form and is here illustrated as of the one-man type. The frame is shown as having a covering 12 of flexible material which is non-adjustably secured to the rear of the body by means of the tacks 13 covered by a beading strip 14. At the front, the covering material is secured to the front bow 15 in any desired manner. Interposed between the front bow 15 and each wind shield support or post 16 or 17 is an adjustable device which will now be described.

Referring to Figures 2 to 5 inclusive, it will be seen that adjacent each wind shield support is a bracket 18 which is secured to the front bow of the top frame by means of the bolts 19. This bracket is formed with an upwardly projecting portion 20 through which is threaded for horizontal adjustment the bolt 21. As shown in the drawings, this bolt comprises a threaded shank 22, which extends through the portion 20 of the bracket and has an offset head 23 formed with the bore 24 and the horizontal slot 25. The post engaging member, having the head 26, is formed with the threaded shank 27, which is slidably mounted in the bore 24 of the bolt, the arrangement being such that the winged portions 28 of the head 26 fit in the slot 25 of the bolt to prevent rotation of the post engaging member. A wing nut 29 is threaded on the shank 27, and interposed between the nut and head 23 are a smooth washer 39 seated in a counterbore 30, and a lock washer 31. The head 26 of the post engaging member is formed with an aperture 32. The bounding surface of the head 26 forming this aperture is curved and, as shown in Fig. 2, is the zone of a sphere, adapted to cooperate with the spherical surfaces 33 and 34 on a knob on the top of the wind shield support 16. This knob is adapted to be clamped between the surface bounding aperture 32 on the post engaging member and the surfaces 35 at the inside of the head of the bolt, the parts being held in clamped position by the wing nut 29 threaded on the shank 27 of the post engaging member. The shank 22 of the bolt is locked in adjusted position in the bracket 18 by means of the lock nut 36.

The above described device constitutes means for adjustably connecting the front of the vehicle top to the wind shield. This adjustment is accomplished by detaching the connection to the wind shield post, turning back the lock nut 36 and rotating the bolt 21 in the bracket 18 in one direction or the other, according as it is desired to decrease or increase the distance between the front of the top and the wind shield support. In the manufacture of the vehicle, both the bodies and the tops, which are of course made independently of each other, vary in length more or less. Consequently, when the two parts, that is to say the top and the body, are assembled, it is found that in some cases the front of the top is too close or too far from the wind shield support for the connection heretofore used. Hence, it is necessary to strain the parts so that the connection may be made. Obviously, this straining is a very undesirable feature as it puts unnecessary stress either on the wind shield support or the top frame or covering. According to this invention, however, provision is made so that variation in the distance between the front of the top and the wind shield support is taken care of. In addition to compensating for inequalities in the manufacture of the vehicle, my device also constitutes a means for varying the tension of the top covering so that as the top stretches with wear, the covering may be brought back to its original tension by increasing the distance between the front bow of the top frame and the wind shield support.

As previously stated the bracket 18 has the upwardly projecting portion 20 which carries the connection to the top of the post, so that this adjustable connection is arranged to be above, and out of conflict with, the means for closing the space between the bow and the top of the wind shield sash. This latter means, which is designed to be associated with the previously described device will now be described.

Secured to the underside of the bow 15 by means of screws 35 is a rigid plate or sheet, preferably of metal, which comprises a flat horizontal portion 36 and a rear upwardly inclined portion 37, this last portion being spaced from the top of the pivoted sash 38 of the wind shield a distance such that the sash may be swung to different positions without striking the sheet. The rear edge of the sheet is beaded or bent over to form the channel 49, for a purpose presently to be mentioned. In order to improve the appearance of the construction the under surface of the sheet has a covering 40 which may be part of the top covering or an independent piece secured to the front lower edge of the bow. Preferably this covering is leather. As shown in Fig. 6, the covering is held taut against the sheet by bending a portion around a cord 41 stitching it thereto and forcing the same into the channel 49, the bead clamping the same securely. The remaining part of the covering piece extends rearward to form a curtain 45 the rear edge of which is secured to the top of the sash 38 as by snap buttons 42. The length of this curtain is sufficient so that the sash may be freely swung to its extreme positions without pulling the curtain taut. As shown in Fig. 7, the curtain 45' may be separate from the covering and secured to the latter by stitching or in any other suitable manner. In making this form of the invention the curtain and covering are stitched together, then the edge portion of the covering is rolled about the cord and stitched or secured thereto. The cord with the attached covering is then forced into the channel 49, where they are clamped by the bead.

In swinging the top down onto the posts, the knob at the top of the latter is liable to strike and injure the covering 40. In order to protect the covering at this point, a plate 43 is secured to the sheet adjacent the post and on the outside of the covering, being fastened as by means of the rivets 44 and having its rear portion bent around the bead at the rear of the sheet, as shown in the drawings.

It will be seen that the sheet and curtain form a means for preventing dust and rain from passing between the top of the wind shield and the vehicle top. Furthermore, the construction is one which can be manufactured and assembled easily and quickly with a minimum of labor. Moreover, by securing the forward part of the curtain in the manner described, any pull or strain which may come on the same is resisted by the portion of the covering secured within the bead, and is not transmitted to the plate covering. Thus the covering for the sheet will not be loosened or pulled away from the sheet, and will always maintain a good appearance. The sheet provides a rigid structure which does not sag and the inclined rear portion with the bead strengthens the same making it rigid and not subject to distortion nor deflection. Moreover the rigid sheet reenforces and strengthens the bow to some extent.

Having thus described my invention what is claimed as new and desired to be secured by Letters Patent is:

1. In a vehicle, the combination with the front bow of the top and a wind shield post, of a bracket secured to said bow, a bolt threaded in said bracket having an offset head formed with a bore the axis of which is parallel to the axis of the threaded part and a post engaging member slidably and non-rotatably mounted in said bore.

2. In combination with the front bow of a vehicle top, a plate secured to the lower side thereof having its rear edge beaded over to form a channel and a covering for the under surface of said plate having a portion in said channel clamped by the bead.

3. In combination with the front bow of a vehicle top and the pivoted wind shield sash, a rigid sheet secured to the under side of the bow having its rear edge slightly spaced from the top of said sash and a curtain secured to the said rear edge and the top of the sash thereby closing the passage between the two.

4. In combination with the front bow of a vehicle top and the pivoted wind shield sash, a rigid sheet secured to the under side of the bow having its rear edge slightly spaced from the top of said sash and a curtain fastened to the said rear edge and detachably secured to the top of the sash thereby closing the passage between the two.

5. In combination with the front bow of a vehicle top and the pivoted wind shield sash, a rigid sheet comprising a flat horizontal portion secured to the under side of the bow and a rear portion inclined upwardly from the flat portion slightly spaced from the top of the sash, and a curtain secured to the rear edge of the sheet and the top of the sash.

6. In combination with the front bow of a vehicle top and the pivoted wind shield sash, a rigid sheet comprising a flat horizontal portion secured to the under side of the bow and a rear portion inclined upwardly from the flat portion slightly spaced from the top of the sash, the rear edge of this latter portion being beaded over to form a channel and a curtain secured within said channel and fastened to the top of the said sash.

7. In combination with the front bow of a vehicle top and the pivoted wind shield sash, a rigid sheet comprising a flat horizontal portion secured to the under side of the bow and a rear portion inclined upwardly from the flat portion and slightly spaced from the top of the sash, the rear edge of this latter portion being beaded over to form a channel a covering for the under surface of said sheet having a portion in said channel clamped by the bead, and a curtain secured to said covering and the top of the said sash.

8. In combination with the front bow of a vehicle top and the pivoted wind shield sash, a rigid sheet comprising a flat horizontal portion secured to the under side of the bow and a rear portion inclined upwardly from the flat portion slightly spaced from the top of the sash, the rear edge of this latter portion being beaded over to form a channel a covering for the under surface of said sheet having a portion in said channel clamped by the bead and a curtain secured to the free portion of the said covering outside said bead and the top of the said sash.

9. In combination with the front bow of a vehicle top and the pivoted wind shield sash, a rigid sheet comprising a flat horizontal portion secured to the under side of the bow and a rear portion inclined upwardly from the flat portion slightly spaced from the top of the sash, the rear edge of this latter portion being beaded over to form a channel a covering for the under surface of said sheet having a portion in said channel clamped by the bead, and a portion forming a curtain between the sheet and sash having its rear edge fastened to the top of the sash.

10. In combination with the front bow of a vehicle top and the pivoted wind shield sash, a rigid sheet comprising a flat horizontal portion secured to the under side of the bow and a rear portion inclined upwardly from the flat portion slightly spaced from the top of the sash, the rear edge of this latter portion being beaded over to form a channel a covering for the under surface of said sheet having its rear edge fastened to the top of the sash and an intermediate portion in the said channel clamped by the bead, whereby the covering is held taut against the sheet.

11. In combination with the front bow of a collapsible vehicle top and the wind shield post and sash, a rigid sheet secured to the underside of the bow having its rear edge adjacent the top of the sash, a covering for the under surface of said sheet, means carried by the bow having a detachable connection with the top of the said post and a plate secured to said sheet adjacent the post outside the covering to protect the covering from striking and being injured by the top of the post.

12. In combination with the front bow of a collapsible vehicle top and the wind shield sash and post, a rigid sheet secured to the underside of the bow having its rear portion inclined upwardly and spaced from the top of the sash, a curtain closing the space between the top of the sash and the rear edge of the sheet, and means carried by the bow extending over the top edge of said sheet having a detachable connection with the top of the post.

13. In combination with the front bow of a collapsible vehicle top and the wind shield sash and post, a rigid sheet secured to the underside of the bow having its rear portion inclined upwardly and spaced from the top of the sash, a curtain closing the space between the top of the sash and the rear edge of the sheet, and means carried by the bow extending over the top edge of said sheet having a detachable connection with the top of the post, a covering for the under surface of said sheet and a plate secured to said sheet adjacent the post outside the covering to protect the covering from striking and being injured by the top of the post.

In testimony whereof I affix my signature.

LEWIS CLAYTON HILL.